(12) United States Patent
Ohashi et al.

(10) Patent No.: US 11,400,363 B2
(45) Date of Patent: Aug. 2, 2022

(54) INFORMATION PROCESSING APPARATUS, INFORMATION PROCESSING SYSTEM, CONTROLLER DEVICE, INFORMATION PROCESSING METHOD, AND PROGRAM

(71) Applicant: Sony Interactive Entertainment Inc., Tokyo (JP)

(72) Inventors: Yoshinori Ohashi, Tokyo (JP); Kazuyuki Arimatsu, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 139 days.

(21) Appl. No.: 16/965,805

(22) PCT Filed: Feb. 16, 2018

(86) PCT No.: PCT/JP2018/005530
§ 371 (c)(1),
(2) Date: Jul. 29, 2020

(87) PCT Pub. No.: WO2019/159332
PCT Pub. Date: Aug. 22, 2019

(65) Prior Publication Data
US 2021/0046380 A1 Feb. 18, 2021

(51) Int. Cl.
*A63F 13/213* (2014.01)
*A63F 13/218* (2014.01)
*A63F 13/24* (2014.01)

(52) U.S. Cl.
CPC .......... *A63F 13/213* (2014.09); *A63F 13/218* (2014.09); *A63F 13/24* (2014.09); *A63F 2300/1093* (2013.01)

(58) Field of Classification Search
CPC ...... A63F 13/213; A63F 13/218; A63F 13/24; A63F 2300/1093
(Continued)

(56) References Cited

U.S. PATENT DOCUMENTS 6,515,669 B1 * 2/2003 Mohri .................... G06F 3/017
345/474
9,002,119 B2 * 4/2015 Hoshino ................ G06K 9/628
382/199
(Continued)

FOREIGN PATENT DOCUMENTS

JP 2003256850 A 9/2003
JP 2015088161 A 5/2015
(Continued)

OTHER PUBLICATIONS

International Preliminary Report on Patentability and Written Opinion for corresponding PCT Application No. PCT/JP2018/005530, 20 pages, dated Aug. 27, 2020.
(Continued)

*Primary Examiner* — Allen Chan
(74) *Attorney, Agent, or Firm* — Matthew B. Dernier, Esq.

(57) ABSTRACT

An information processing apparatus connected to a controller device equipped with proximity sensors that are provided for at least respective fingers of a user, estimating amounts of bending of the fingers of the user using a first method on the basis of detection results from the proximity sensors, estimating a posture and a shape of a hand of the user using a second method different from the first estimation method, and correcting by using information estimated by the first method, information regarding an amount of movement of each finger in a bending direction in information regarding the posture and the shape of the hand of the user estimated by the second method to generate information relating to the posture and the shape of the hand of the user.

8 Claims, 5 Drawing Sheets

(58) Field of Classification Search
USPC .......................................................... 463/36
See application file for complete search history.

(56) References Cited

U.S. PATENT DOCUMENTS

| | | | |
|---|---|---|---|
| 9,880,629 B2 | | 1/2018 | Moscarillo |
| 2010/0152619 A1* | | 6/2010 | Kalpaxis .............. A61B 5/0002 |
| | | | 600/592 |
| 2013/0265218 A1 | | 10/2013 | Moscarillo |
| 2014/0098018 A1* | | 4/2014 | Kim ........................ G06F 3/014 |
| | | | 345/156 |
| 2015/0089455 A1 | | 3/2015 | Yamada |
| 2017/0235364 A1 | | 8/2017 | Nakamura |

FOREIGN PATENT DOCUMENTS

| | | |
|---|---|---|
| JP | 2015519624 A | 7/2015 |
| WO | 2016038953 A1 | 3/2016 |

OTHER PUBLICATIONS

International Search Report for corresponding PCT Application No. PCT/JP2018/005530, 8 pages, dated Apr. 27, 2018.

\* cited by examiner

INFORMATION PROCESSING APPARATUS, INFORMATION PROCESSING SYSTEM, CONTROLLER DEVICE, INFORMATION PROCESSING METHOD, AND PROGRAM

TECHNICAL FIELD

The present invention relates to an information processing apparatus, an information processing system, a controller device, an information processing method, and a program.

BACKGROUND ART

A controller device in a home video game machine or the like detects an operation performed by a user, such as pressing a button or swinging the device, and sends information indicating the detected user's operation to a main body of the game machine or the like.

In recent years, as one of such controller devices, a device that captures an image of a user's hand or fingers with a camera and obtains information regarding a posture and a shape (position, orientation, pose, and the like) of the user's hand is known.

SUMMARY

Technical Problems

However, in the case of trying to acquire information regarding the posture and shape of the user's hand by capturing images of the user's hand or fingers with the camera, there are cases where images of the finger movement cannot be captured by the camera depending on the arrangement of the camera and the position of the user's hand and sufficient information regarding the posture and shape of the user's hand cannot be obtained. Further, in the images from the camera, it is difficult to recognize the detailed movement of the user's fingertip because of limitation of the image resolution.

The present invention has been made in view of the above circumstances, and an object is to provide an information processing apparatus, an information processing system, a controller device, an information processing method, and a program that can more accurately acquire information regarding the posture and shape of a user's hand.

Solution to Problems

An embodiment of the present invention that solves the problems of the above conventional example is an information processing apparatus, including first estimating means for estimating a bending amount of a user's finger by use of a proximity sensor on the basis of a detection result of the proximity sensor, second estimating means for estimating a posture and a shape of a user's hand by a method different from that of the first estimating means, and generating means for generating information regarding the posture and the shape of the user's hand, by correcting the information regarding an amount of movement of each finger in a bending direction in the information regarding the posture and the shape of the user's hand estimated by the second estimating means, by using the information estimated by the first estimating means.

Advantageous Effect of Invention

According to the present invention, information regarding the posture and the shape of the user's hand estimated by a method other than using the proximity sensor, such as capturing an image by a camera, is corrected by using the information regarding the amount of bending of the finger obtained by the proximity sensor so that information regarding the posture and shape of the user's hand can be acquired more precisely.

DESCRIPTION OF EMBODIMENT

Figure 1:
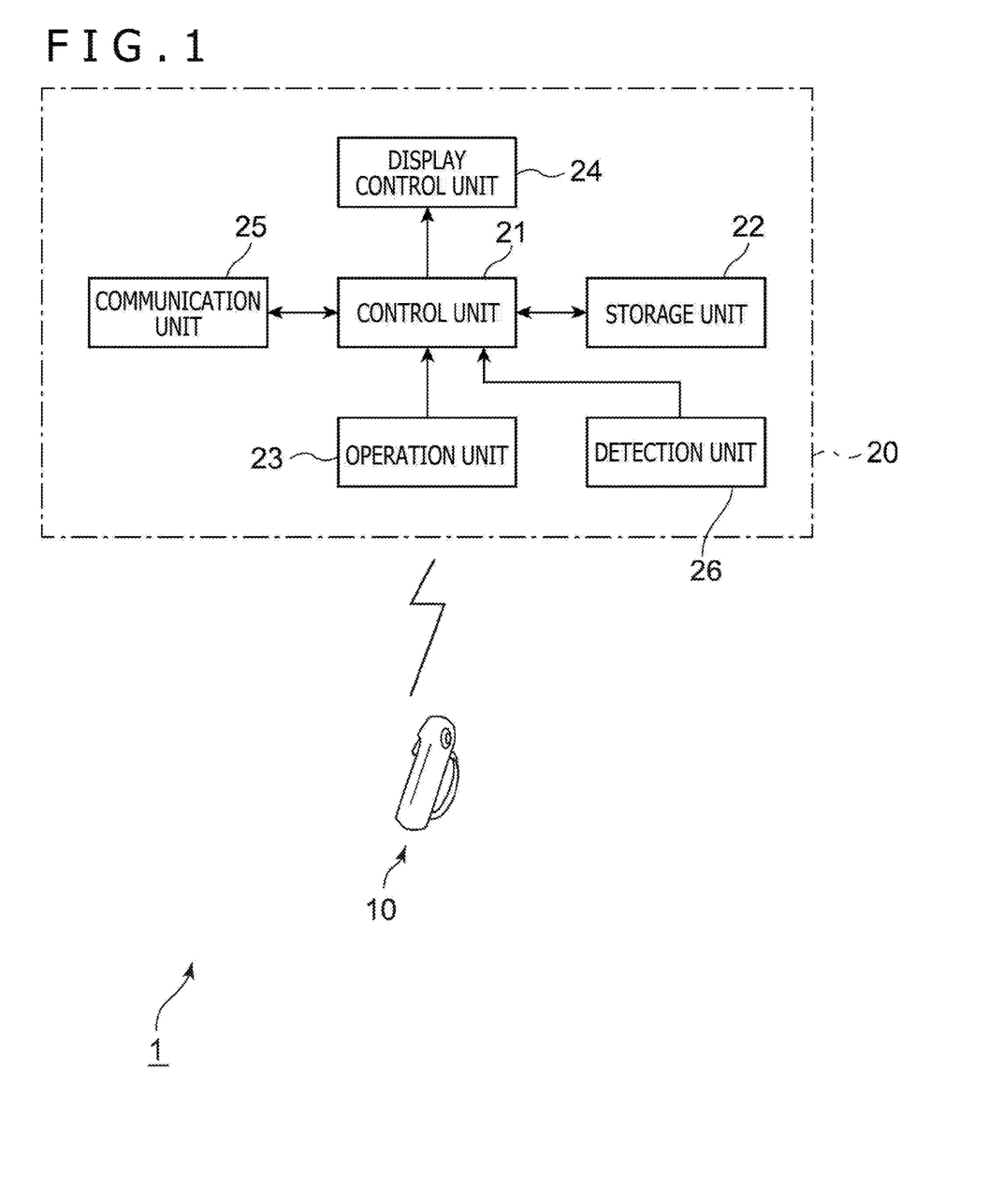
FIG. 1 is a block diagram illustrating a configuration example of an information processing system according to an embodiment of the present invention.

An embodiment of the present invention will be described with reference to the drawings. An information processing system 1 according to an embodiment of the present invention includes a controller device 10 held by a user's hand and an information processing apparatus 20, as illustrated in FIG. 1.

Figure 2:
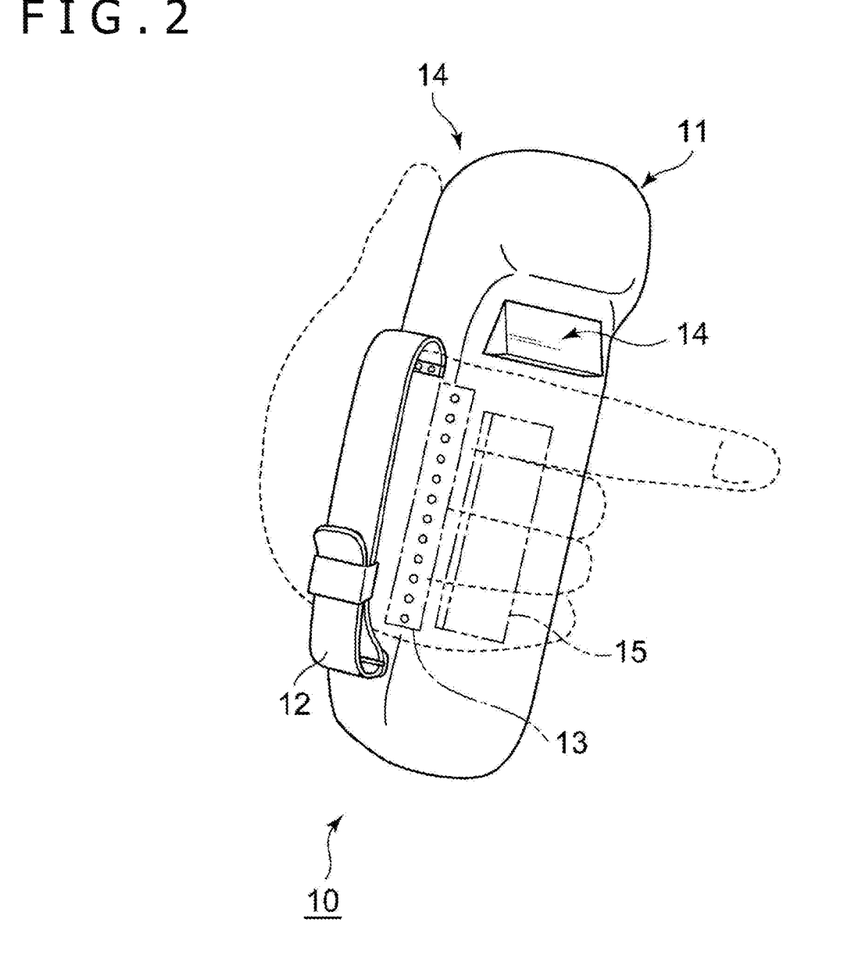
FIG. 2 is a schematic perspective view illustrating an example of a controller device according to the embodiment of the present invention.

The controller device 10 has a substantially columnar housing 11, and a fixing material 12 that stretches across user's fingers for fixing the housing 11 to the vicinity of the base of the user's finger is attached to the housing 11, as the outline is illustrated in FIG. 2. In one example of the present embodiment, the fixing material 12 is an annular belt, and the housing 11 can be fixed to the user's hand by adjusting a diameter of the annular portion.

Incidentally, in the description of the present embodiment, a size, a ratio, an arrangement, and the like of each part are merely examples, and the example of the present embodiment is not limited to the illustrated size, ratio, and arrangement.

Further, in an example of the present embodiment, a plurality of proximity sensors 13 are provided on a surface of the housing 11 at least for respective fingers of the user (at least the number corresponding to respective fingers). The proximity sensor 13 is an infrared (IR) sensor, for example, and includes an infrared light emitting unit 13$s$ and an infrared light receiving unit 13$r$. In the proximity sensor 13 of this example, when the controller device 10 is fixed to a user's hand, the infrared light emitting unit 13$s$ and the infrared light receiving unit 13$r$ perform emission of infrared light in the direction of the user's finger and detection of infrared light that is reflected back from the direction.

Then, the proximity sensor 13 of this example acquires information indicating a distance between the proximity sensors 13 and an object (such as a user's finger) that is first confronted when viewed in the direction of the user's finger from the proximity sensors 13, by use of a triangulation method or the like using an imaging position when the infrared light emitted by the infrared light emitting unit 13s is received by the infrared light receiving unit 13r. Then, the proximity sensor 13 outputs information regarding the distance.

In the example of the present embodiment, since the proximity sensor 13 is provided at least for each finger (at least as many as the number of fingers so that each finger can be individually detected), the controller device 10 obtains, by using the proximity sensor 13, information regarding the distance between the housing 11 of the controller device 10 itself and each finger of the user corresponding to each proximity sensor 13. Here, the distance to the user's finger detected by the proximity sensor 13 may be the distance to the user's fingertip, or may be the distance to the base of the finger (from the metacarpal phalangeal joint (MP joint) to the proximal interphalangeal joint (PIP joint)). Even when the distance to the root of the finger is employed, since the distance increases when the user extends the finger, and the distance between the housing 11 and the root of the finger decreases in accordance with the amount of bending when the user bends the finger, the bending amount of the user's finger can be detected on the basis of this distance.

Further, an operation unit 14 is arranged on the housing 11 of the controller device 10 at a position where a user's finger (may be some fingers such as a thumb and an index finger) reaches when the user holds the housing 11. The operation unit 14 may include a button, a joystick capable of tilting operation, and the like, for example.

Further, the controller device 10 includes a circuit unit 15 inside the housing 11. The circuit unit 15 includes a wired communication unit such as a universal serial bus (USB) or a wireless communication unit such as a Bluetooth (registered trademark) in addition to a microcomputer, and transmits and receives information to and from the information processing apparatus 20. The circuit unit 15 repeatedly sends information indicating the distance to the corresponding user's finger obtained by each proximity sensor 13 to the information processing apparatus 20 at predetermined timings (for example, at regular timings). Further, the circuit unit 15 repeatedly sends information (information such as a button depression amount, a joystick tilt direction, a tilt amount) indicating an operation performed by the user on the operation unit 14 at predetermined timings (for example, at regular timings).

The information processing apparatus 20 is, for example, a home video game machine, and includes a control unit 21, a storage unit 22, an operation unit 23, a display control unit 24, a communication unit 25, and a detection unit 26 as illustrated in FIG. 1.

Here, the control unit 21 is a program control device such as a central processing unit (CPU), and operates in accordance with a program stored in the storage unit 22. The control unit 21 of the present embodiment estimates the amount of bending of the user's finger, on the basis of the detection result of the proximity sensor 13 provided for each finger of the user (here, for example, information regarding the distance to the corresponding finger) received from the controller device 10 (hereinafter, a method of estimating using the detection result of the proximity sensor 13 of the controller device 10 is referred to as a first estimation method). Further, the control unit 21 estimates the posture and the shape of the hand of the user by a method different from the first estimation method (referred to as a second estimation method).

As the second estimation method, there is a method of estimating the posture and the shape of the hand of the user on the basis of information regarding an image obtained by the detection unit 26 to be described later, for example. As an example of the second estimation method, a widely known method such as a method using a bone model or a method using machine learning can be adopted, and also, for example, Leap Motion that is a product of Leap Motion can be used, and therefore detailed description is omitted here.

The control unit 21 also corrects the information regarding the amount of movement of each finger in the bending direction in the information regarding the posture and the shape of the user's hand estimated by the second estimation method by using information estimated by the first estimation method to generate information regarding the posture and the shape of the user's hand. The operation of the control unit 21 will also be described later in detail.

The storage unit 22 is a memory device, a disk device, or the like, and stores a program executed by the control unit 21. This program may be provided by being stored in a computer readable and non-transitory recording medium, and may be stored in the storage unit 22. In addition, the storage unit 22 also operates as a work memory of the control unit 21.

The operation unit 23 performs wired or wireless communication with the controller device 10, and receives information representing the content of the user operation performed on the controller device 10, thereby outputting the information to the control unit 21. Further, the operation unit 23 receives a detection result of the proximity sensor 13 provided for each finger of the user from the controller device 10 and outputs the detection result to the control unit 21.

The display control unit 24 is connected to a display or the like, and controls and causes the display or the like to perform display output of the information in accordance with an instruction input from the control unit 21. The communication unit 25 is a network interface, for example, and transmits and receives information via a network in accordance with an instruction input from the control unit 21.

The detection unit 26 is, for example, a pair of cameras installed to capture an image in a direction so as to capture images of the user holding the controller device 10 and includes a group of optical sensors (sensor group) arranged two-dimensionally (such as in a matrix or in a staggered arrangement on a plane). This optical sensor may be a sensor such as a charge-coupled device (CCD) or a complementary metal-oxide semiconductor (CMOS). Further, an infrared detecting element may be used.

The detection unit 26 repeatedly obtained image data by capturing images of the user at predetermined timings, and outputs the image data to the control unit 21. Note that the detection unit 26 is an example, and in another example of the present embodiment, the detection unit 26 does not output the image data of the captured image of the user as it is and may output what is generally called a depth map image that represents the distance to the surface of the firstly existing object in a direction corresponding to each pixel of the obtained image, for example, or may output various types of information obtained by capturing images, such as outputting an infrared thermographic image (image capturing result of infrared light, that is, a heat map) by including an infrared detecting element.

Figure 3:
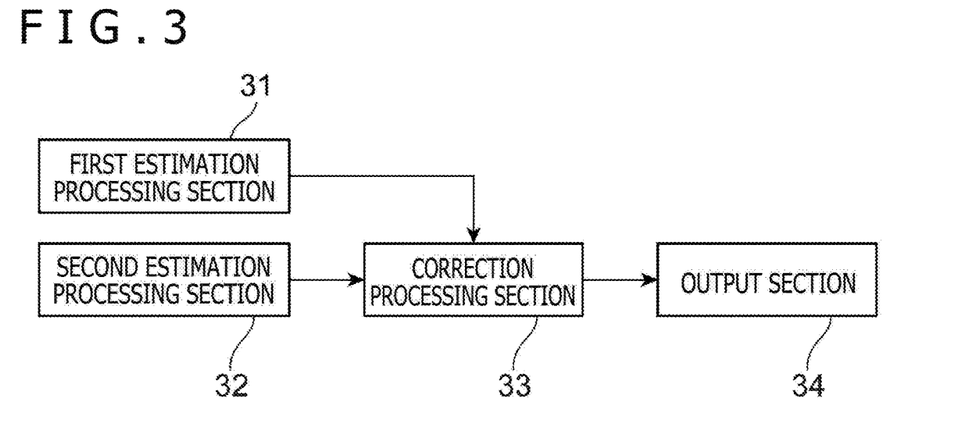
FIG. 3 is a functional block diagram illustrating an example of an information processing apparatus according to the embodiment of the present invention.

Next, the operation of the control unit 21 will be described. The control unit 21 according to the present embodiment executes a program stored in the storage unit 22 to functionally actuate an information processing apparatus including a first estimation processing section 31, a second estimation processing section 32, a correction processing section 33, and an output section 34, as illustrated in FIG. 3.

Here, the first estimation processing section 31 estimates the bending amount of each finger of the user on the basis of the detection result of the proximity sensor 13 of the controller device 10. That is, the first estimation processing section 31 acquires information regarding the distance measured by each proximity sensor 13 from the controller device 10.

Figure 4:
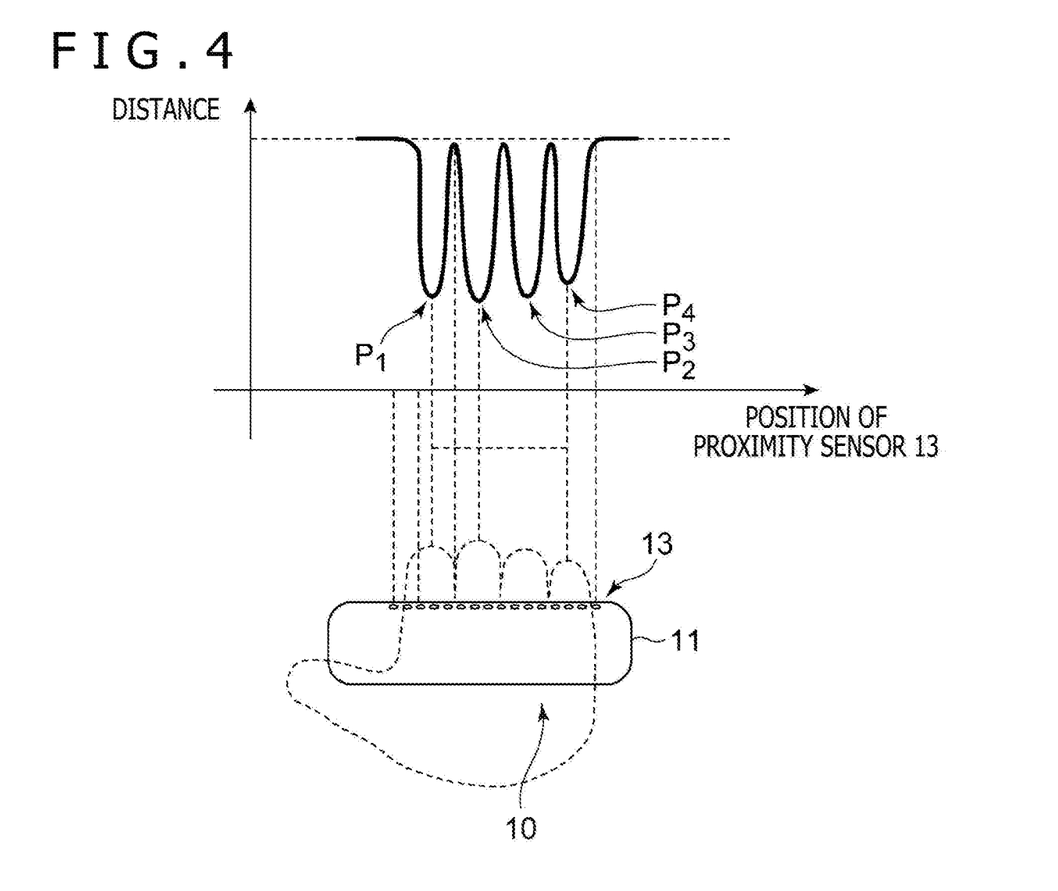
FIG. 4 is an explanatory diagram illustrating an example of a detection result output by the controller device according to the embodiment of the present invention.

To be specific, when the information regarding the distance measured by each of the proximity sensors 13 is illustrated as a graph in the order of arrangement from the index finger side to the little finger side of the user's hand to which the controller device 10 is fixed, in the case where the user bends all the fingers, as illustrated in FIG. 4, the distances from the proximity sensors 13 to the bent fingers are obtained so that the positions at respective fingers forming peaks (downward peaks) P1, P2, . . . are observed.

Therefore, when the user bends all the fingers and takes a pose holding the controller device 10, as an initial calibration process, the first estimation processing section 31 detects the positions of the above-described peaks, and selects the proximity sensors 13 corresponding to the respective fingers at least one by one, and stores information for identifying the selected proximity sensor 13 (the sensor may be identified by a value n when the finger is the nth from the index finger side). The result of the calibration is stored in the storage unit 22 together with the information for identifying the user, and once the calibration is performed, when the user who is going to use the information processing apparatus 20 is authenticated, the result of the calibration associated with the information identifying the authenticated user may be read and used. Alternatively, calibration is performed for a user having an average hand size, and the calibration result for the user having the average hand size may be used regardless of who the user is.

Thereafter, the first estimation processing section 31 detects the amount of bending of each finger (a pitch angle $\theta P$ in FIG. 5) on the basis of the information regarding the distance output by the proximity sensor 13 stored for each finger.

In one example of the present embodiment, a data table indicating how the amount of bending (pitch angle $\theta P$) of the finger changes in response to the output of the proximity sensor 13 with respect to a change in the information regarding the distance output by the proximity sensor 13 is obtained experimentally in advance and is stored in the storage unit 22, so that the first estimation processing section 31 refers to this data table and obtains information indicating the amount of bending of each finger (pitch angle $\theta P$ in FIG. 5) on the basis of the distance information (an average or a minimum value thereof or the like in the case where there are a plurality of proximity sensors 13 corresponding to a certain finger) output from the proximity sensor 13 stored for each finger.

The second estimation processing section 32 estimates the posture and the shape of the user's hand using the information output by the detection unit 26. The second estimation processing section 32 estimates inclination, a rotation angle, and an amount of bending (a yaw angle $\theta Y$ (inclination of the finger in the plane of the palm, that is, an angle of the opening direction between the fingers), a roll angle $\theta R$ (a rotation angle around an axis A of the finger) and the pitch angle $\theta P$ (the rotation angle of the finger in the bending direction) in FIG. 5) of each finger of the user on the basis of, for example, a depth map output by a depth sensor that captures images of the hand of the user. The second estimation processing section 32 estimates the position of the user's hand, the inclination, the rotation angle, and the bending amount (the yaw angle $\theta Y$, the roll angle $\theta R$, and the pitch angle $\theta P$ in FIG. 5) of each finger on the basis of the depth map, for example, by using machine learning results.

Further, the second estimation processing section 32 may further obtain information indicating the position of the user's hand on the basis of the depth map obtained by capturing images of the user's hand. This information may be represented, for example, by three-dimensional coordinate values based on the position of the depth sensor that outputs the depth map.

Figure 5:
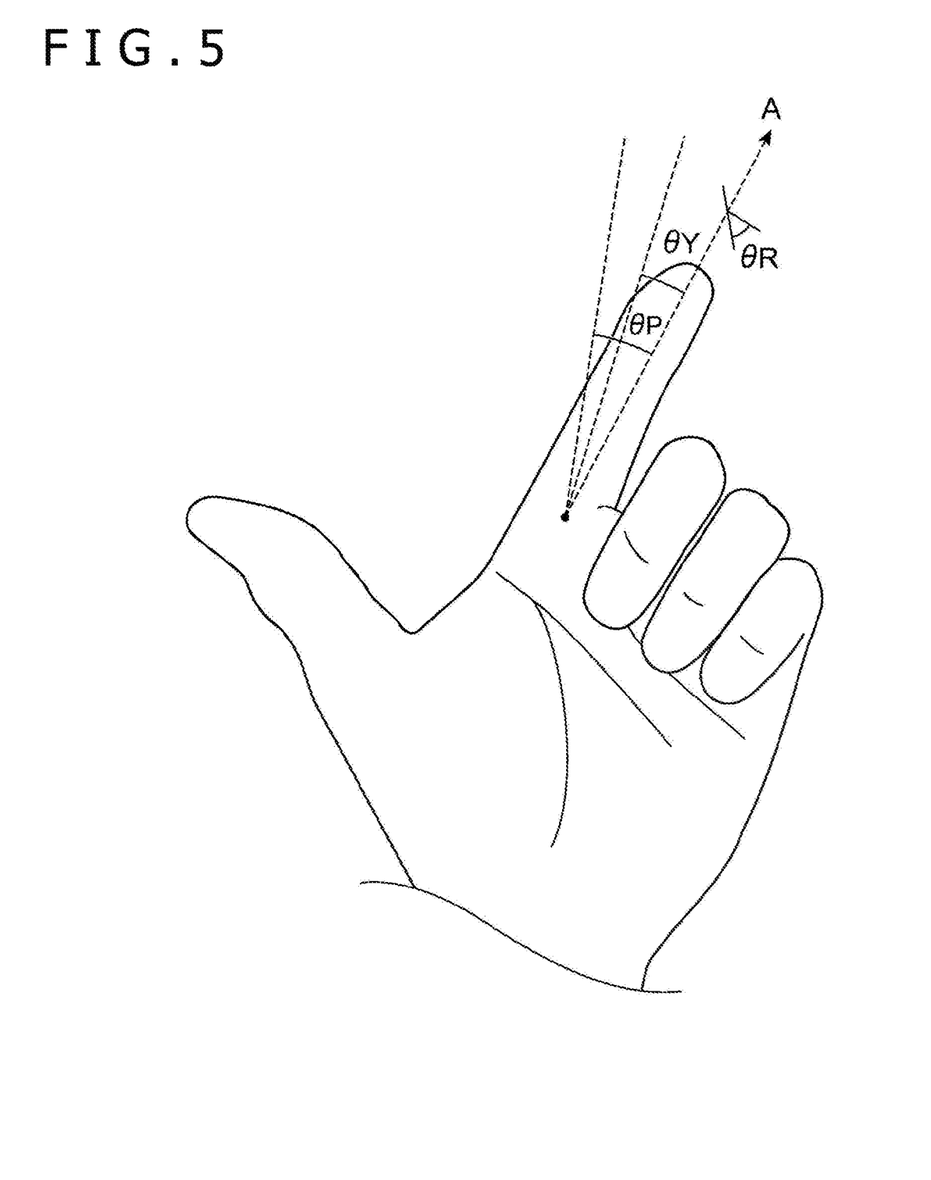
FIG. 5 is an explanatory diagram illustrating an example of information regarding a finger estimated by the information processing apparatus according to the embodiment of the present invention.

The correction processing section 33 substitutes the information of the finger bending amount (pitch angle $\theta P$ in FIG. 5) obtained by the first estimation processing section 31 for each corresponding finger, among the inclination, the rotation angle, and the bending amount (the yaw angle $\theta Y$, the roll angle $\theta R$, and the pitch angle $\theta P$ in FIG. 5) of each finger output by the second estimation processing section 32 for correction to output the resultant. It should be noted that the correction processing section 33 outputs information other than the information obtained by the first estimation processing section 31 (in this example, the pitch angle $\theta P$ of each finger of the user), as it is without any correction in the information obtained by the second estimation processing section 32.

The output section 34 outputs information output by the correction processing section 33 and provides the information to the processing of an application program (for example, a game program).

[Operation]

The information processing system 1 according to the embodiment of the present invention has the above configuration, and operates as follows.

The user grips the controller device 10 with the user's hand (at least one hand of the left hand and the right hand), fastens the fixing material 12 with the fingers passing through the fixing material 12, and fixes the controller device 10 at a position so that the housing 11 comes into contact with the bases of the fingers. Accordingly, even if the user opens the user's hand (extends the user's fingers), the controller device 10 does not fall.

The controller device 10 is provided with a plurality of proximity sensors 13, for example, that emit infrared light in the direction of the user's finger and detect infrared light reflected back from the direction of the user's finger and repeatedly obtains the information of the bending amount (pitch angle $\theta P$) of each finger (here, the index finger, middle finger, third finger, or little finger are intended, but the proximity sensor 13 for detecting the thumb may be provided to detect the bending amount) of the user's hand holding the controller device 10 at predetermined timings and transmits the information to the information processing apparatus 20.

Figure 6:
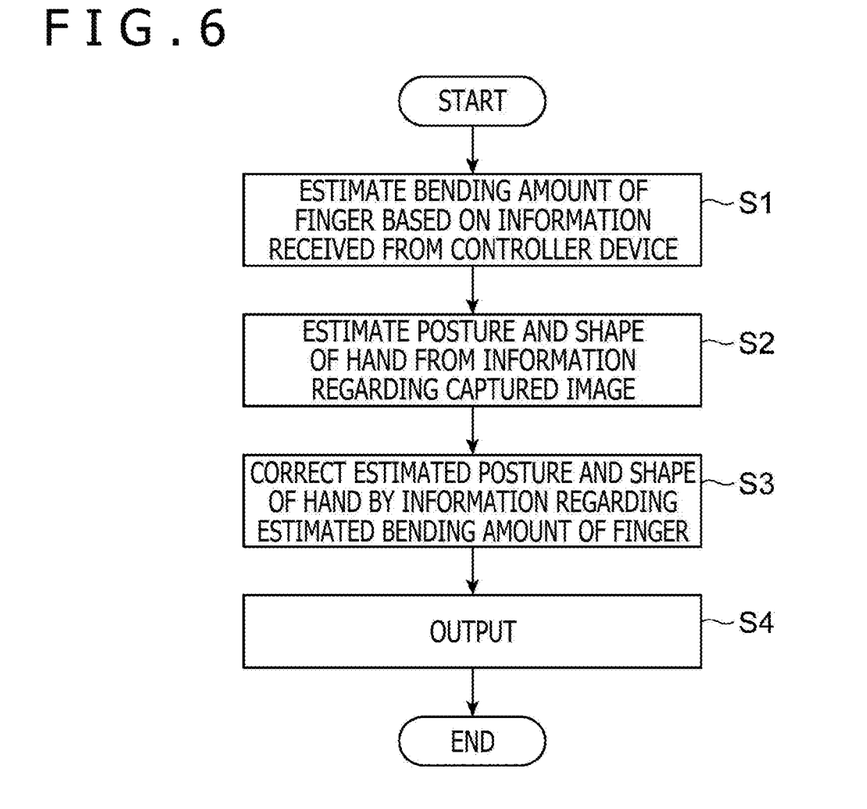
FIG. 6 is a flowchart illustrating an operation example of the information processing apparatus according to the embodiment of the present invention.

The information processing apparatus 20 executes the processing illustrated in FIG. 6 and estimates pitch angles $\theta P'1$, $\theta P'2$, $\theta P'3$, and $\theta P'4$ of respective fingers of the user (here, the index finger, middle finger, third finger, and little finger) as the bending amount of the user's finger, by the first estimation method based on the detection result of the proximity sensor 13 provided for each finger of the user (here, for example, information regarding the distance to the corresponding finger) received from the controller device 10 (S1).

Further, the information processing apparatus 20 estimates the position of the hand of the user holding the controller device 10, and the posture and the shape by the second estimation method different from the first estimation method based on the image of the user's hand captured by the camera as the detection unit 26 connected to the information processing apparatus 20 or the image capturing result (depth map) by the depth sensor (S2).

In the process S2, information regarding a position (x, y, z) of the hand of the user holding the controller device 10, and the posture and the shape (an angle α around the lower arm direction of the user's wrist, an amount of bending β of the wrist joint, inclinations θY1, θY2, . . . of respective fingers, rotation angles θR1, θR2, . . . of respective fingers, and bending amounts θP1, θP2, . . . of respective fingers) is obtained. Note that the information regarding the inclination, the rotation angle, and the amount of bending of each finger is detected to be expressed on the basis of the palm surface of the user (for example, the inclination θY=0, the rotation angle θR=0, and the bending amount θP=0 are set when the fingers are put together and straightened on the basis of the base of the finger).

The information processing apparatus 20 replaces for correction the information θP1, θP2, θP3, and θP4 of the movement amounts of respective fingers in the bending direction in the information regarding the posture and the shape of the user's hand estimated by the second estimation method with the information θP'1, θP'2, θP'3, and θP'4 estimated by the first estimation method (S3), and generates and outputs the information regarding the posture and the shape of the hand of the user (S4).

Note that the information processing apparatus 20 does not correct the information other than the information obtained by the first estimation method (in this example, the pitch angle θP of each finger of the user), in the information obtained by the second estimation method in the process S3. Therefore, the information output in the process S4 includes the position (x, y, z) of the user's hand estimated in the process S2 and the angle α around the lower arm direction of the user's wrist, the amount of bending β of the wrist joint, and the inclinations θY1, θY2, . . . of the respective fingers, and the pitch angles θP'1, θP'2, θP'3, and θP'4 of the respective fingers of the user estimated in process S1 in the posture and shape information.

The information regarding the position of the user's hand, and the posture and the shape (but data such as the pitch angle of the finger, which has been corrected by the output of the sensor of the controller device 10) is used for processing of an application program of a game or the like.

[Position of Proximity Sensor]

In the above description of the present embodiment, it is assumed that the proximity sensor 13 of the controller device 10 is disposed on the surface of the housing 11 on the user's finger side when the housing 11 is held by the user's hand (the sensor is arranged at a position where the infrared light can be emitted to the user's finger side and the reflected light from this side can be received), but the present embodiment is not limited to this.

As an example, at least some of the proximity sensors 13 of the controller device 10 according to the present embodiment may be provided on the fixing material 12. That is, in the present embodiment, the proximity sensor 13 may be provided also on the surface of the fixing material 12 facing the fingers of the user. In this case, the proximity sensor 13 disposed on the fixing material 12 detects that the finger approaches as the user extends the finger.

Therefore, in this example, the control unit 21 of the information processing apparatus 20 selects each proximity sensor 13 actually detecting a finger one by one among the proximity sensors 13 arranged on the fixing material 12 when the user is in a pose in which all the fingers are extended (for example, as an initial calibration process, the user is asked to extend the finger in order from the index finger, and on the basis of the detection result during that time, the proximity sensor 13 detecting each finger may be identified). The result of the calibration may be stored in the storage unit 22 together with the information for identifying the user, and may be used for later processing.

The control unit 21 of the information processing apparatus 20 detects the bending amount (pitch angle θP in FIG. 5) of each finger on the basis of the distance information output by the proximity sensor 13 stored for each finger, and at this time regarding the proximity sensor 13 arranged on the housing 11, a first data table indicating how the finger bending amount (pitch angle θP) changes in accordance with the output of the proximity sensor 13 arranged on the housing 11 side is obtained experimentally in advance and stored in the storage unit 22, and a second data table representing how the amount of bending of the finger (pitch angle θP) changes in accordance with the output of the proximity sensor 13 disposed on the fixing material 12 is also obtained experimentally in advance and stored in the storage unit 22.

The information processing apparatus 20 refers to the first data table on the basis of the information regarding the distance output by the proximity sensor 13 disposed on the housing 11 side and stored for each finger (an average or a minimum value thereof or the like in the case where there are a plurality of proximity sensors 13 corresponding to a finger), and obtains information representing the bending amount of each finger (pitch angle θP in FIG. 5).

In addition, the information processing apparatus 20 refers to the second data table on the basis of the information regarding the distance output by the proximity sensor 13 disposed on the fixing material 12 side and stored for each finger (an average or a minimum value thereof or the like in the case where there are a plurality of proximity sensors 13 corresponding to a finger), and obtains information indicating the amount of bending of each finger (pitch angle θP in FIG. 5).

In this example, if a plurality of pieces of information regarding the pitch angle θP are obtained for the same finger (for example, the index finger) from the proximity sensors 13 disposed on the housing 11 and the fixing material 12 respectively, the information processing apparatus 20 may obtain an average value and may correct the information regarding the posture and the shape of the user's hand estimated by the second estimation method by using the average value.

[Another Example of Correction Method]

Further, in the examples described above, it is assumed that the information processing apparatus 20 corrects the information θP1, θP2, θP3, and θP4 regarding the amounts of movement of respective fingers in the bending direction in the information regarding the posture and the shape of the user's hand estimated by the second estimation method by replacing the information regarding the amount of movement with information θP'1, θP'2, θP'3, and θP'4 estimated by the first estimation method, but the present embodiment is not limited to this.

For example, the information processing apparatus 20 may correct information θP1, θP2, θP3, and θP4 of the movement amounts of respective fingers in the bending direction in the information regarding the posture and the shape of the hand of the user estimated by the second estimation method, by using a weighted average of the information θP1, θP2, θP3, and θP4 of the movement amounts of respective fingers in the bending direction in the information regarding the posture and the shape of the user's hand estimated by the second estimation method and the information θP'1, θP'2, θP'3, and θP'4 estimated by the first estimation method.

As an example, the information processing apparatus 20 may replace the information θP1, θP2, θP3, and θP4 of the movement amounts of respective fingers in the bending direction in the information regarding the posture and the shape of the user's hand estimated by the second estimation method, with a weighted average of information θP1, θP2, θP3, and θP4 of the movement amounts of respective fingers in the bending direction and information θP'1, θP'2, θP'3, and θP'4 estimated by the first estimation method, that is, with $$θP''1=(a·θP1+b·θP'1)/(a+b)$$

$$θP''2=(a·θP2+b·θP'2)/(a+b)$$

$$θP''3=(a·θP3+b·θP'3)/(a+b)$$

$$θP''4=(a·θP4+b·θP'4)/(a+b).$$

Here, a and b are real numbers, respectively, and may be experimentally determined in advance.

In another example, the weights a and b of the weighted average may differ depending on the magnitude of θP or θP'. For example, in the case where it is determined that the result of the estimation based on the proximity sensor 13 (first estimation method) is more reliable as the finger is bent more, the corresponding weighted average value b is set so as to be large compared to a, as the estimation result θP by the second estimation method or the result of the estimation θP' based on the proximity sensor 13 becomes larger. For example, b=f((θP+θP')/2) is satisfied. Here, f(x) is a monotonically increasing function for x.

[Another Example of Proximity Sensor]

Further, in the above description, a sensor using infrared light has been described as an example of the proximity sensor 13, but the present embodiment is not limited to this. For example, the proximity sensor 13 may be a capacitance sensor or the like disposed on the surface of the housing 11 of the controller device 10 and detecting a contact state of a hand. In this case, the capacitance sensor need not always be provided for each finger, and an integrated capacitance sensor may detect information regarding the bending amounts of a plurality of fingers.

As an example, the controller device 10 sends the output of the sensor to the information processing apparatus 20, and the information processing apparatus 20 estimates information θP'1, θP'2, θP'3, and θP'4 regarding the finger bending amount on the basis of the information of the detection result of the capacitance sensor or the like that detects the contact state of the hand (degree of distance of each finger from the housing 11).

Note that in the example of the present embodiment, though the second estimation processing section 32 estimates the posture and the shape of the user's hand using the information output by the detection unit 26, the detection unit 26 may include a plurality of proximity sensors (a group of sensors such as capacitance sensors) arranged two-dimensionally in a matrix or the like on the surface of the controller device 10, for example.

The proximity sensor functioning as the detection unit 26 is preferably different from the proximity sensor 13, and, for example, assuming that a capacitance sensor having a relatively large area is used as the proximity sensor 13, which detects the distance from the controller device 10 to the finger with relatively high accuracy, the proximity sensor of the detection unit 26 may use a plurality of capacitance sensors each having a relatively small area and arranged two-dimensionally, for the purpose of the detection of the position of the finger rather than the accuracy of the distance from the controller device 10 to the finger.

In addition, while the proximity sensor 13 is mounted on the controller device 10, the detection unit 26 may be attached to the controller device 10 (detachable). In this case, the controller device 10 does not include the proximity sensor of the detection unit 26 as a product.

In the case where the proximity sensors are used in such way, the detection unit 26 outputs information indicating the distance (shortest distance) from each proximity sensor to the user's finger. Furthermore, the proximity sensors in this case are not limited to examples in the two-dimensional arrangement, but may be one-dimensionally arranged in a line (for example, a greater number of proximity sensors than the fingers). In this case, the information output by the detection unit 26 is waveform information indicating the distance (shortest distance) from each proximity sensor to the user's finger. As a method for estimating the posture and the shape of the user's hand from such information, a widely known method can be employed, and thus detailed description thereof will be omitted.

REFERENCE SIGNS LIST

1 Information processing system, 10 Controller device, 11 Housing, 12 Fixing material, 13 Proximity sensor, 14 Operation unit, 15 Circuit unit, 20 Information processing apparatus, 21 Control unit, 22 Storage unit, 23 Operation unit, 24 Display control unit, 25 Communication unit, 26 Detection unit, 31 First estimation processing section, 32 Second estimation processing section, 33 Correction processing section, 34 Output section.

The invention claimed is:

1. An information processing apparatus comprising:
first estimating section for estimating a bending amount of a finger of a user by using a proximity sensor on a basis of a detection result of the proximity sensor;
second estimating section for estimating a posture and a shape of a hand of the user by a method different from a method of the first estimating section; and
generating means for correcting information regarding an amount of movement of each finger in a bending direction in information regarding the posture and the shape of the hand of the user estimated by the second estimating section, by using information estimated by the first estimating section and for generating information regarding the posture and the shape of the hand of the user.

2. The information processing apparatus according to claim 1, wherein the proximity sensor used by the first estimating section is an infrared sensor or a capacitance sensor.

3. The information processing apparatus according to claim 1, wherein the second estimating section uses an output of a sensor group arranged one-dimensionally or two-dimensionally and estimates the posture and the shape of the hand, based on the output of the sensor group.

4. The information processing apparatus according to claim 1, wherein the proximity sensor is a sensor that is arranged on a device surface held by the hand of the user and detects a contact state of the hand, and the first estimating section estimates the bending amount of the finger of the user, based on information regarding a detection result of the sensor that is arranged on the device surface held by the hand of the user and detects the contact state of the hand.

5. An information processing system comprising:

an information processing apparatus; and a controller device to be held by a hand of a user, the controller device including a fixing material for fixing the controller device to the hand of the user with the controller device in contact with the hand, and a proximity sensor provided at least for each finger of the user, the controller device outputting information indicating a distance to each finger of the user detected by the proximity sensor to the information processing apparatus as information regarding a detection result, the information processing apparatus including first estimating section for estimating a bending amount of each finger of the user, based on the information regarding the detection result of the proximity sensor input from the controller device, second estimating section for estimating a posture and a shape of the hand of the user by a method different from a method of the first estimating section, and generating section for correcting information regarding an amount of movement of each finger in a bending direction in information regarding the posture and the shape of the hand of the user estimated by the second estimating section by using information estimated by the first estimating section and for generating information regarding the posture and the shape of the hand of the user, wherein the proximity sensor of the controller device includes at least a proximity sensor arranged on the fixing material.

6. A controller device to be held by a hand of a user comprising:

a fixing material for fixing the controller device to the hand of the user with the controller device in contact with the hand;

a proximity sensor provided at least for each finger of the user; and a control unit that outputs information representing a distance to the finger of the user detected by the proximity sensor as information regarding a detection result, wherein the proximity sensor includes at least a proximity sensor arranged on the fixing material.

7. A method for processing information by using a computer, comprising:

estimating a bending amount of a finger of a user, based on a detection result of a proximity sensor by using the proximity sensor provided at least for each finger of the user;

estimating a posture and a shape of a hand of the user by a method different from a method of the estimating the bending amount of the finger of the user; and generating information regarding the posture and the shape of the hand of the user by correcting information regarding an amount of movement of each finger in a bending direction in information regarding the posture and the shape of the hand of the user estimated by the estimating the posture and the shape of the hand of the user, by using information estimated by the first estimating means.

8. A non-transitory, computer-readable storage medium containing a computer program, which when executed by a computer, causes the computer to carry out actions, comprising:

estimating a bending amount of a finger of a user, based on a detection result of a proximity sensor by using the proximity sensor provided at least for each finger of the user;

estimating a posture and a shape of a hand of the user by a method different from a method of the estimating the bending amount of the finger of the user; and generating information regarding the posture and the shape of the hand of the user by correcting information regarding an amount of movement of each finger in a bending direction in information regarding the posture and the shape of the hand of the user estimated in the estimating the posture and the shape of the hand of the user, by using information estimated in the estimating the bending amount of the finger of the user.

* * * * *